United States Patent
Kume et al.

(10) Patent No.: US 8,672,081 B2
(45) Date of Patent: Mar. 18, 2014

(54) POWER ASSISTED VEHICLE

(75) Inventors: Yohei Kume, Osaka (JP); Hideo Kawakami, Osaka (JP); Shohei Tsukada, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 755 days.

(21) Appl. No.: 12/921,240

(22) PCT Filed: Jan. 14, 2010

(86) PCT No.: PCT/JP2010/000169
§ 371 (c)(1),
(2), (4) Date: Sep. 7, 2010

(87) PCT Pub. No.: WO2010/087115
PCT Pub. Date: Aug. 5, 2010

(65) Prior Publication Data
US 2011/0015842 A1    Jan. 20, 2011

(30) Foreign Application Priority Data
Jan. 29, 2009  (JP) ................. 2009-018663

(51) Int. Cl.
*B60K 1/00*  (2006.01)
(52) U.S. Cl.
USPC ....................... 180/292; 180/19.1
(58) Field of Classification Search
USPC .......... 180/292, 19.1, 19.3, 19.2, 11, 15
See application file for complete search history.

(56) References Cited

U.S. PATENT DOCUMENTS

| 3,380,546 | A  | * | 4/1968  | Rabjohn ................... 180/19.2 |
| 5,746,282 | A  |   | 5/1998  | Fujiwara et al. |
| 6,276,471 | B1 | * | 8/2001  | Kratzenberg et al. ...... 180/19.3 |
| 6,343,665 | B1 | * | 2/2002  | Eberlein et al. ............. 180/19.1 |
| 6,976,287 | B2 | * | 12/2005 | Muth ........................ 15/340.1 |
| 7,779,941 | B1 | * | 8/2010  | Rankin et al. .............. 180/19.1 |
| 2007/0089238 | A1 | * | 4/2007 | Kramer et al. ................. 5/618 |
| 2008/0040857 | A1 | * | 2/2008 | Karmer et al. ................. 5/616 |

FOREIGN PATENT DOCUMENTS

| JP | 8-282498    | 10/1996 |
| JP | 10-109647   | 4/1998  |
| JP | 2000-142411 | 5/2000  |
| JP | 2004-120875 | 4/2004  |
| JP | 2006-143216 | 6/2006  |

OTHER PUBLICATIONS

International Search Report issued Apr. 20, 2010 in International (PCT) Application No. PCT/JP2010/000169.

* cited by examiner

*Primary Examiner* — Hau Phan
(74) *Attorney, Agent, or Firm* — Wenderoth, Lind & Ponack, L.L.P.

(57) ABSTRACT

A power assisted vehicle includes a wheel drive unit that transmits power of a motor as assist power to wheels via clutches capable of connecting and disconnecting power transmission, input rotation angle detection units that detect rotation angles of input shafts of the clutches, output rotation angle detection units that detect rotation angles of output shafts of the clutches, and assist power calculation units that calculate the relative angle difference between the rotation angles of the input shafts of the clutches and the rotation angles of the output shafts of the clutches, and while clearing the relative angle difference in a predetermined period, calculate the assist power on the basis of the relative angle difference before it is cleared.

13 Claims, 7 Drawing Sheets

POWER ASSISTED VEHICLE

TECHNICAL FIELD

The present invention relates to a power assisted vehicle that can travel when the wheels are driven by assist power.

RELATED ART

A variety of power assisted vehicles that can use a combination of man-powered wheel drive and assist power wheel drive that aids the man power have been suggested.

For example, there is a power assisted carriage (electric power assisted carriage) 30 disclosed in Patent Document 1. As shown in FIG. 7, the power assisted carriage 30 is provided in the rear portion thereof with a handle 31. The handle 31 is rotatably supported at the lower end thereof by a pin 32 and sandwiched from the front and rear sides between spring members 33. Therefore, the handle 31 can swing in the front-rear direction of the power assisted carriage 30. Where the handle 31 is tilted by the power applied to the handle by the user of the power assisted carriage 30, the inclination of the handle is detected by a potentiometer 34 provided slightly above the pin 32. The assist power (assist force) corresponding to the man power detected by the potentiometer 34 is calculated and an electric motor connected to wheels 35 is driven by the assist power, whereby the wheels can be driven by a combination of man power and assist power.

However, in the conventional power assisted carriage, for example, when the user operates the carriage that carries a large load or the like, an excessively large assist power can be generated. For example, when the field of view is blocked by the load placed on the carriage, the carriage sometimes cannot be advanced because of a step or an obstacle that is not recognized by the user. In such a case, the user often applies a large operation force (man power) so as to move the power assisted carriage. As a result, an excessively high assist power can be generated in the power assisted carriage. In such a case, the operation of the power assisted carriage becomes unstable. In the worst case scenario, the power assisted carriage can run away and tumble.

Patent Document 1: Japanese Patent Application Laid-Open No. 10-109647

SUMMARY OF THE INVENTION

It is an object of the present invention to provide a power assisted vehicle that can be safely operated without generating an excessively high power, even when the power assisted vehicle does not move although a large operation force is applied thereto.

A power assisted vehicle according to one aspect of the present invention includes: a wheel drive unit that transmits assist power from a power source to wheels via a clutch capable of connecting and disconnecting power transmission; an input rotation angle detection unit that detects a rotation angle of an input shaft of the clutch; an output rotation angle detection unit that detects a rotation angle of an output shaft of the clutch; and an assist power calculation unit that calculates a relative angle difference between the rotation angle of the input shaft of the clutch detected by the input rotation angle detection unit and the rotation angle of the output shaft of the clutch detected by the output rotation angle detection unit, clears to zero the relative angle difference in a predetermined period, and calculates the assist power on the basis of the relative angle difference in each period.

EMBODIMENTS FOR CARRYING OUT THE INVENTION

Embodiments of the present invention will be described below with reference to the drawings. The below-described embodiments explain the present invention by way of example and can be changed appropriately within a range that can be conceived of by a person skilled in the art. The present invention is not limited to the below-described embodiments. In the explanation below, like components are assigned with like reference symbols and explanation thereof is herein omitted.

Embodiment 1

Figure 1:
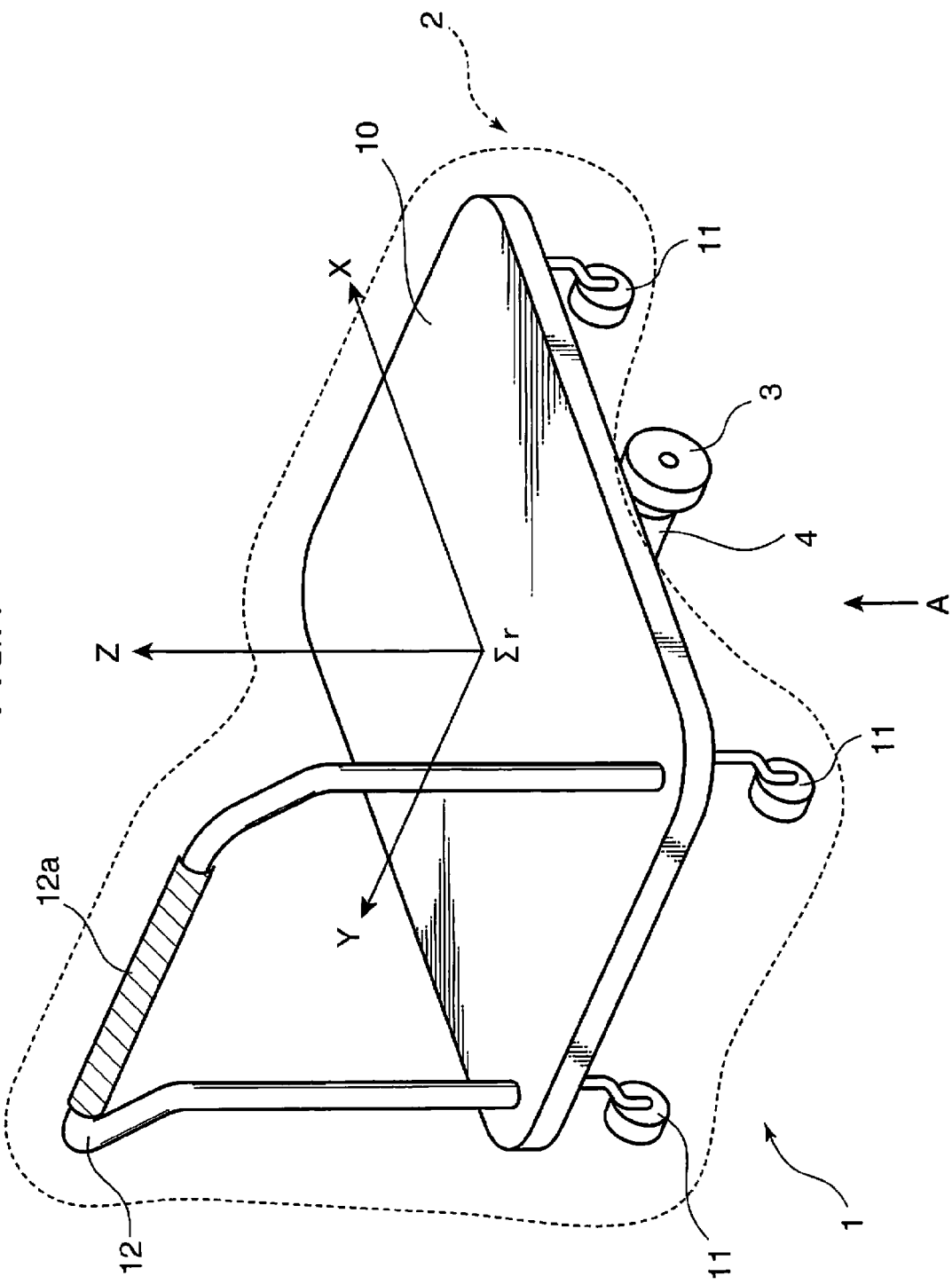
FIG. 1 is a perspective view of a power assisted carriage according to Embodiment 1 of the present invention.
Figure 2:
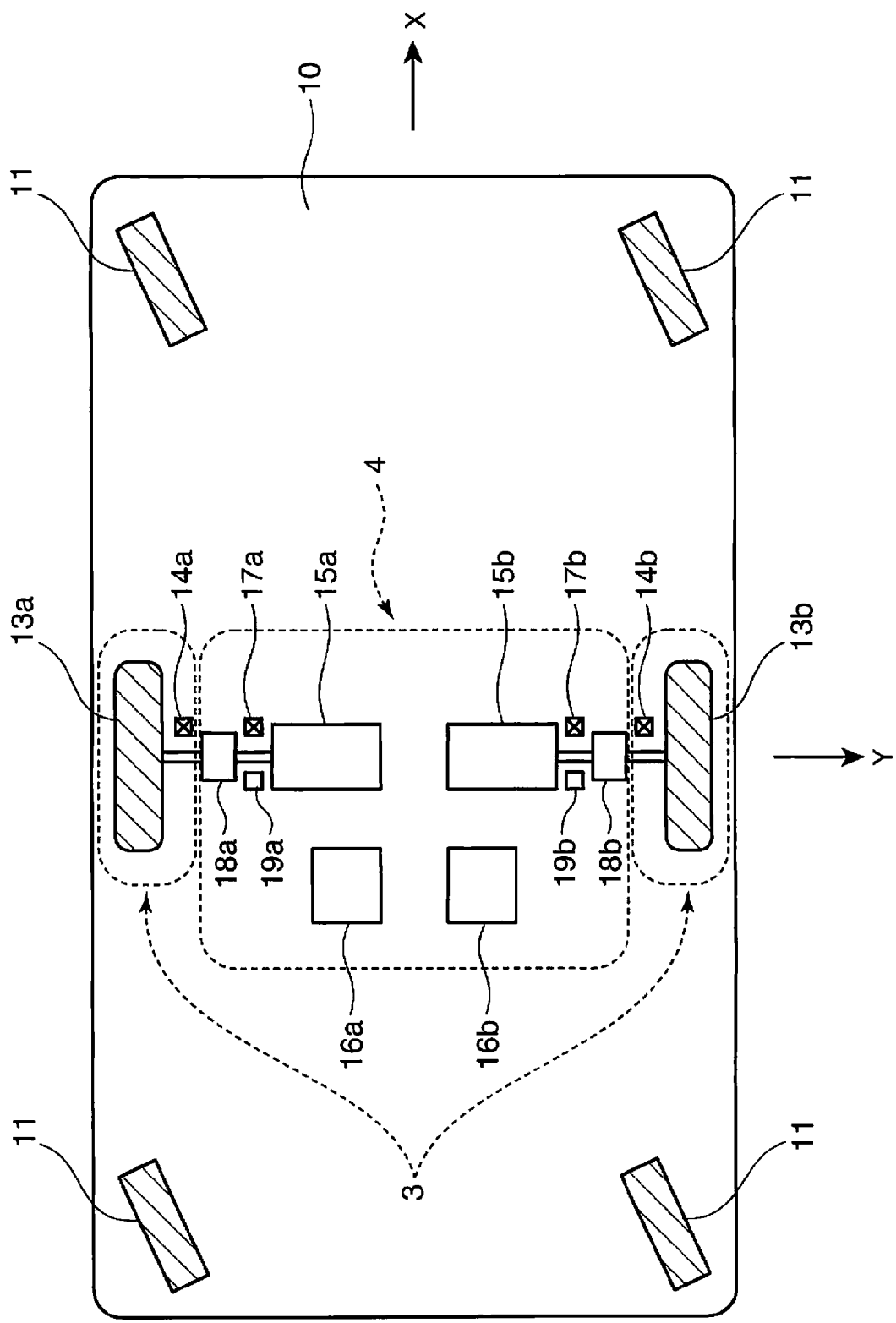
FIG. 2 is a view of the power assisted carriage according to Embodiment 1 of the present invention from a direction A in FIG. 1.
Figure 3:
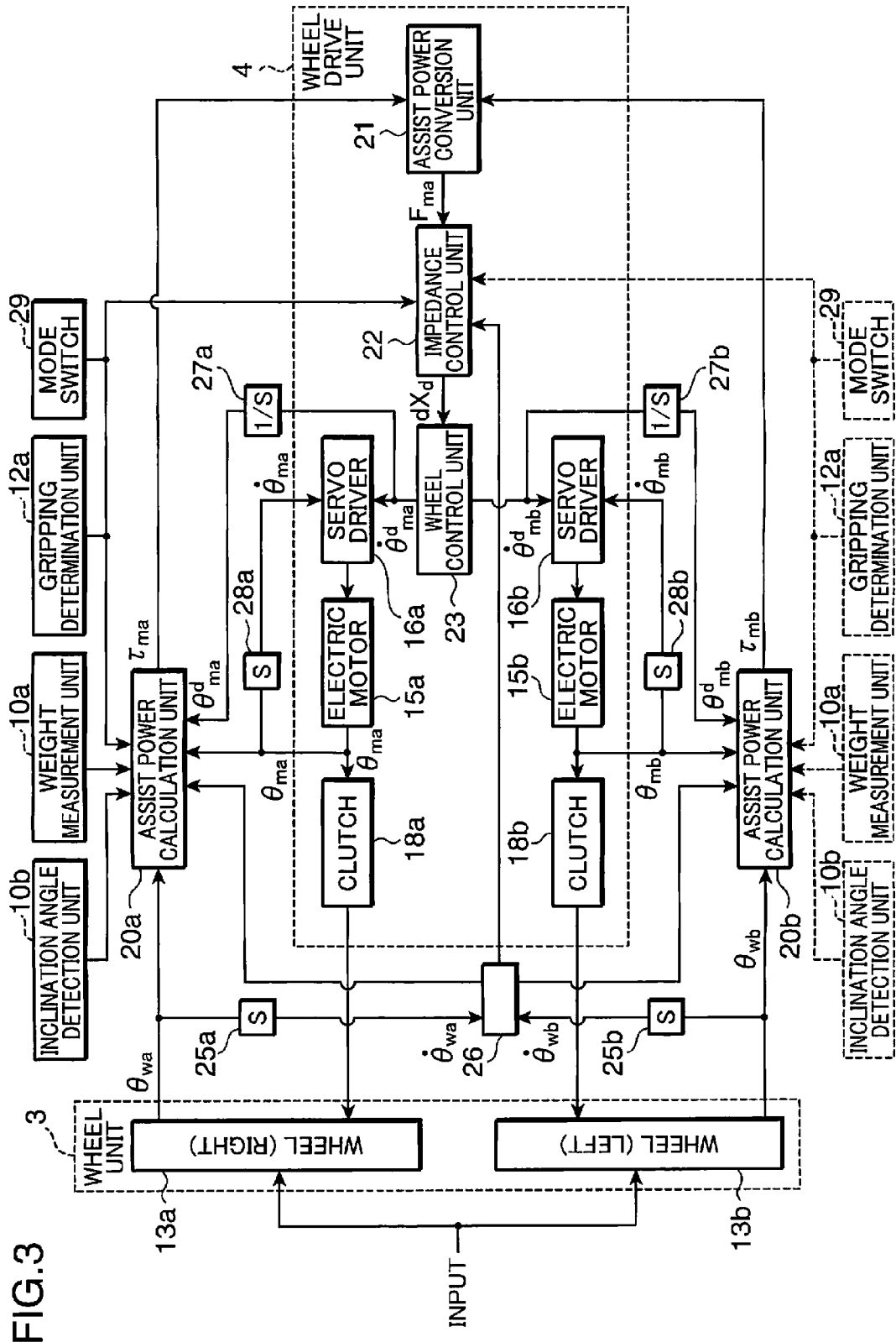
FIG. 3 is a block diagram illustrating a system configuration of the power assisted carriage according to Embodiment 1 of the present invention.

FIG. 1 is a perspective view of a power assisted carriage according to Embodiment 1 of the present invention. FIG. 2 is a view of the power assisted carriage according to Embodiment 1 of the present invention from a direction A in FIG. 1. FIG. 3 is a block diagram illustrating a system configuration of the power assisted carriage according to Embodiment 1 of the present invention. To facilitate the explanation, a carriage coordinate system Σr (coordinate system having three mutually orthogonal axes: X, Y, and Z) that is fixed to a power assisted carriage (power assisted vehicle) 1 and moves together with the power assisted carriage 1 is set as shown in FIG. 1. A plane constituted by the X axis and Y axis of the carriage coordinate system Σr is taken as a horizontal plane parallel to the ground surface (road surface) that is a movement surface where the power assisted carriage 1 moves. The X axis is directed forward of the power assisted carriage 1.

The operation of the power assisted carriage 1 is defined in the carriage coordinate system Σr. In the configuration shown in the figures, the power assisted carriage 1 comprises a carriage unit 2 that carries an article (not shown in the figure) placed thereon, a wheel unit 3 for imparting a travel force to the carriage unit 2, and a wheel drive unit 4 for driving the wheel unit 3. In this case, the carriage unit 2 comprises a loading platform 10 of a rectangular shape, a carriage support unit 11 disposed on the lower surface of the loading platform 10, and a handle 12 that can be gripped by the user. When the user pushes the carriage 1, man power is provided to the handle 12.

The loading platform 10 is provided with a weight measurement unit 10a (see FIG. 3) that measures the weight of the loaded article and an inclination angle detection unit 10b (see FIG. 3) that detects an inclination angle of the road where the carriage travels. A device such as a pressure sensor can be used as the weight measurement unit 10a. An inclination angle sensor of an electrostatic capacitance system that detects variations in liquid surface caused by inclination as variations in electrostatic capacitance can be used as the inclination angle detection unit 10b.

The carriage support unit 11 stably supports the carriage unit 2 and has passive wheels that can be moved in all directions on the basis of the applied force. In Embodiment 1, casters, which are passive wheels that can move in all directions, are used as the carriage support unit 11. Four casters (carriage support unit 11) are disposed in four corners at the lower surface of the loading platform 10. Further, in Embodiment 1, the origin of the carriage coordinate system Er is set in the center of the rectangle having the positions of the four casters as corner points.

The handle 12 is composed of pipe-like members, has a gate-like configuration and is disposed in the rear region of the loading platform 10. A grip determination unit 12a that can determine whether the user has gripped the handle is provided in the central portion of the handle 12. A touch sensor of an electrostatic capacitance system that detects variations in electrostatic capacitance caused by contact with a person (user) can be used as the grip determination unit 12a.

The wheel unit 3 comprises two wheels 13a, 13b that can be independently driven. The wheels 13a, 13b are disposed at both ends in the central portion of the lower surface of the loading platform 10 so as to be oriented in the X axis direction, that is, so that the rotation axis thereof is perpendicular to the Y axis. Pneumatic tires can be used as the wheels 13a, 13b. Output rotation angle detection units 14a, 14b for detecting rotation angles of the wheels are mounted on the wheels 13a, 13b, respectively. Devices such as encoders can be used as the output rotation angle detection units 14a, 14b.

The wheel drive unit 4 is provided with electric motors 15a, 15b as power sources for applying power to the wheels 13a, 13b, servo drivers 16a, 16b for drive controlling the electric motors 15a, 15b, input rotation angle detection units 17a, 17b for detecting rotation angles of drive shafts of the electric motors 15a, 15b, and clutches 18a, 18b for transmitting power of the electric motors 15a, 15b to the wheels 13a, 13b or disconnecting the transmission. The input shafts of the clutches 18a, 18b are connected to the electric motors 15a, 15b, and the output shafts of the clutches 18a, 18b are connected to the wheels 13a, 13b.

In Embodiment 1, two-way clutches (bidirectional clutches) that can transmit/disconnect power in two directions are provided as the clutches 18a, 18b. The two-way clutches as referred to herein are clutches that can transmit power of the electric motors 15a, 15b to the wheels 13a, 13b. In addition, these clutches can disengage the input shafts and output shafts when the electric motors 15a, 15b are stopped or when the electric motors 15a, 15b are driven, but the wheels 13a, 13b are rotated at a speed higher than that of the electric motors 15a, 15b in the rotation direction of the drive shafts. This operation can be performed when the drive shafts of the electric motors 15a, 15b rotate either forward or in reverse. In the two-way clutches, where the input shafts (electric motors 15a, 15b) are rotated, the output shafts (wheels 13a, 13b) are thereby also rotated. A notable specific feature of the two-way clutch is that where the output shaft is rotated in a disengaged state, the output shaft rotates freely by itself and does not transmit power to the input shaft. By using such two-way clutches, it is possible to assist the man power (force applied by the user) in forward-rearward movement operation or turning operation of the power assisted carriage 1.

Devices such as encoders can be used as the input rotation angle detection units 17a, 17b. Further, the power assisted carriage 1 is also provided with wheel speed calculation units 25a, 25b that calculate the speed of wheels 13a, 13b, a movement speed and acceleration calculation unit 26 that calculates its own movement speed and movement acceleration, motor target angle calculation units 27a, 27b that calculate the target rotation angles of the electric motors 15a, 15b, and motor speed calculation units 28a, 28b that calculate the speeds of the electric motors 15a, 15b. In Embodiment 1, the movement speed detection unit calculates the movement speed by using the below-described Jacobian matrix with respect to a signal obtained by differentiating the output signals of the output rotation angle detection units 14a, 14b. The movement acceleration detection unit calculates the movement acceleration by differentiating the movement speeds calculated by the movement speed detection unit. The movement speed and acceleration calculation unit 26 may be constituted by independent movement speed detection unit and movement acceleration detection unit. A device such as an acceleration sensor that can detect its own movement acceleration may be carried as the movement speed and acceleration calculation unit 26 on the power assisted carriage 1. In this case, the movement speed and acceleration calculation unit 26 may calculate the movement acceleration by the output signal thereof and calculate movement speed by the integral value of the calculated movement acceleration. Further, a device such as a tachogenerator that can detect the rotation angle speed of the wheels 13a, 13b may be carried as the movement speed and acceleration calculation unit 26 by the carriage 1. In this case, the movement speed and acceleration calculation unit 26 may calculate the movement speed by using the below-described Jacobian matrix with respect to the output signal thereof and then calculate the movement acceleration by differentiating the calculated signal.

As shown in FIG. 3, the power assisted carriage 1 is provided with assist power calculation units 20a, 20b for calculating the assist power that has to be generated by the wheel unit 3 on the basis of the force applied by the user, an assist power conversion unit 21 that converts the calculated assist power into assist power of the total power assisted carriage 1, an impedance control unit 22 that performs impedance control corresponding to the calculated total assist power, and a wheel control unit 23 that converts the target speed of the entire power assisted carriage 1 calculated by the impedance control unit 22 into the target speed of the wheel unit 3 and issues a command to servo drivers 16a, 16b.

The assist power calculation units 20a, 20b calculate the assist power that has to be generated by the wheels 13a, 13b by taking the rotation speeds of the wheels 13a, 13b, rotation speeds of the electric motors 15a, 15b, and target rotation angle of the electric motors 15a, 15b as input information. The calculated assist power is inputted to the assist power conversion unit 21. The assist power conversion unit 21 takes the calculated assist power as input information and calculates the assist power of the entire power assisted carriage 1. The calculated assist power of the entire carriage 1 is inputted to the impedance control unit 22. In the impedance control unit 22, the calculated assist power of the entire carriage 1 is taken as input information, and target speed information satisfying the impedance characteristic that has been set is calculated. The calculated target speed information is inputted to the wheel control unit 23. In the wheel control unit 23, the target speed of the entire power assisted carriage 1 is taken as input information, the target speed of the wheels 13a, 13b is calculated, and a command is issued to servo drivers 16a, 16b. In this case, because the servo drivers 16a, 16b are speed controlled, the wheels 13a, 13b are driven by the electric motors 15a, 15b so as to follow the target speed of the wheels.

With such a configuration, the electric motors 15a, 15b can be driven according to the assist power based on the power applied by the user. In Embodiment 1, the assist power conversion unit 21, impedance control unit 22, and wheel control unit 23 are assumed to be included in the wheel drive unit 4. In FIG. 3, the upper inclination angle detection unit 10b connected to the assist power calculation unit 20a is the same as the lower inclination angle detection unit 10b connected to the assist power calculation unit 20b, but in FIG. 3 the two units are shown in two locations for the sake of convenience. The same is true for the weight measurement unit 10a, grip detection unit 12a, and mode switch 29.

A specific operation flow in Embodiment 1 will be described below by using the flowchart shown in FIG. 4. To facilitate understanding, the explanation below is conducted with respect to the case in which the values of assist power of the wheels 13a, 13b are calculated simultaneously, but in the flowchart shown in FIG. 4, calculations of the assist power of the wheels 13a, 13b are represented by a loop to illustrate successive calculations (steps S100, S107).

First, the rotation angles $\theta_{wa}$, $\theta_{wb}$ of the wheels 13a, 13b detected by the output rotation angle detection units 14a, 14b are set as described below, and the rotation angles $\theta_{ma}$, $\theta_{mb}$ of the electric motors 15a, 15b detected by the input rotation angle detection units 17a, 17b are set as described below.

$$\theta_{wa}, \theta_{wb} \in R$$

$$\theta_{ma}, \theta_{mb} \in R$$

Let us consider the case in which the user applies a force to the handle 12 of the stationary power assisted carriage 1 and moves the power assisted carriage 1 in the positive direction of X axis of the coordinate system τr. In this case, a torque is applied to the two, left and right, wheels 13a, 13b in response to the applied force and the wheels 13a, 13b are rotated. As a result, a relative rotation angle difference appears between the rotation angles $\theta_{wa}$, $\theta_{wb}$ of the wheels 13a, 13b and the rotation angles $\theta_{ma}$, $\theta_{mb}$ of the electric motors 15a, 15b. In this case, the assist power calculation units 20a, 20b calculate assist power $\tau_{ma}$, $\tau_{mb}$ by using Equations (1) and (2) below on the basis of the relative rotation angle difference generated between the rotation angles $\theta_{wa}$, $\theta_{wb}$, of the wheels and the rotation angles $\theta_{ma}$, $\theta_{mb}$ of the electric motors 15a, 15b. Thus, the assist power calculation units 20a, 20b calculate a value obtained by multiplying the rotation angle difference by a coefficient as the assist power.

$$\tau_{ma} = K_a(\theta_{wa} - \theta_{ma}) \in R \quad (E1)$$

$$\tau_{mb} = K_b(\theta_{wb} - \theta_{mb}) \in R \quad (E2)$$

where $K_a$, $K_b \in R$

Here, $K_a$, $K_b$ are forward rotation gain constants. Equations (1) and (2) serve to calculate the assist power adapted for the man power, using the relative rotation angle difference between the input shafts and output shafts of the clutches 18a, 18b generated by the applied man power.

By using the above-described relationship, it is determined whether a relative rotation angle difference (referred to hereinbelow as relative angle difference) is present between the rotation angles of the wheels 13a, 13b and the electric motors 15a, 15b (step S101).

Where a relative angle difference is determined in step S101 to be present (YES in step S101), the relative angle difference is cleared (reset to zero) in the predetermined period (step S102).

Figure 5:
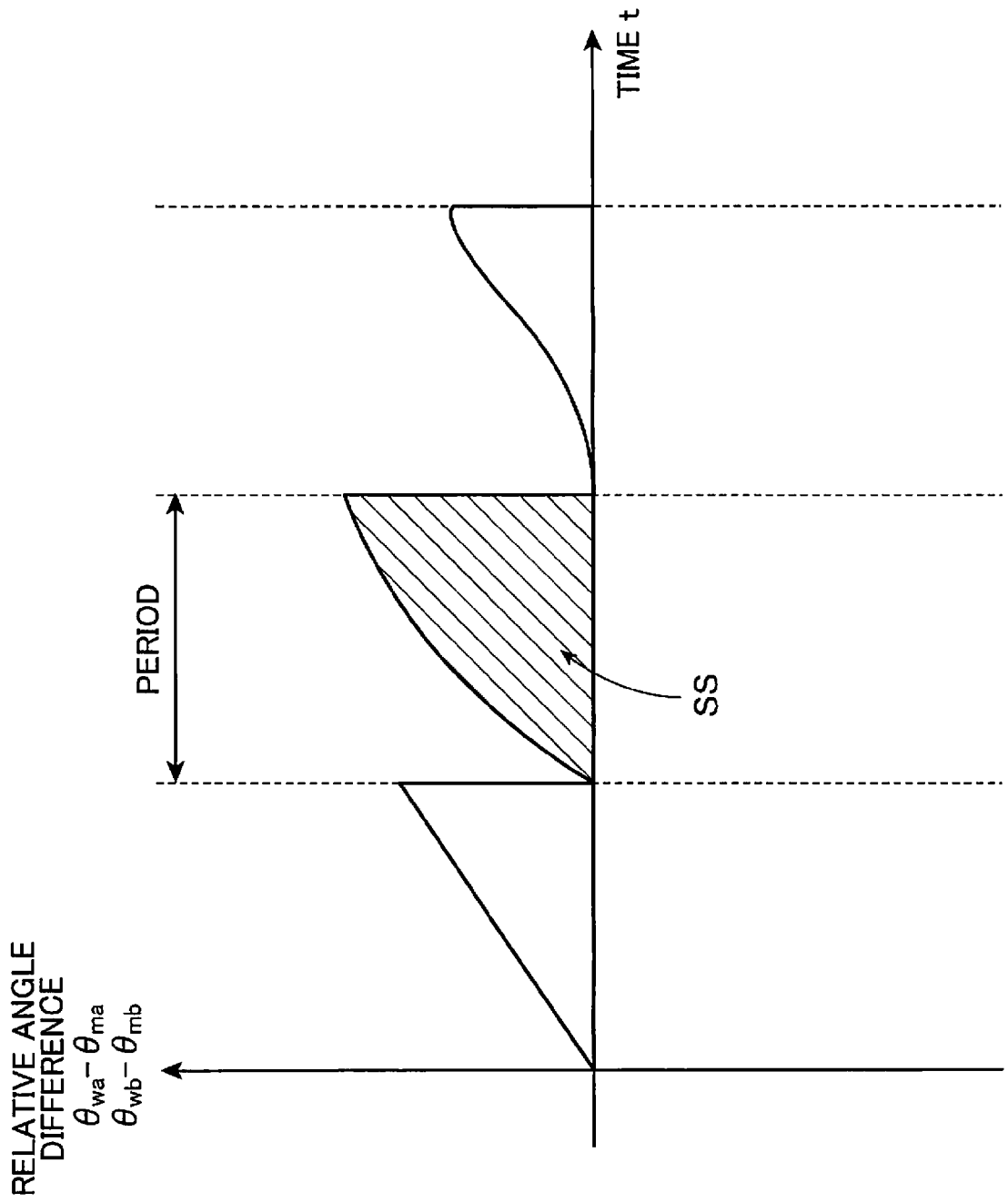
FIG. 5 illustrates a method for deriving a surface area SS.

This measure is taken for the following reason. Because the wheels 13a, 13b and the electric motors 15a, 15b are connected via the clutches 18a, 18b, where a relative rotation angle difference is generated between the components before and after the clutch, this relative angle difference does not decrease as long as there is no rotation in mutually opposite directions. Further, since the relative angle difference does not decrease, the assist power calculated from Equations (1) and (2) above is continuously generated even when the user does not push the carriage 1. This will be explained with reference to FIG. 5. FIG. 5 shows schematically the transition in relative angle difference. In the figure, the relative angle difference is plotted against the ordinate and time is plotted against the abscissa. The area SS in FIG. 5 represents an area bounded by a transition curve indicating a transition in the relative angle difference (per period) within a time interval from one zero clearance to the next zero clearance and a transition line indicating a transition in the relative angle difference in the case the transition is made at a zero relative angle difference. In other words, the area SS in FIG. 5 is an integral value of the relative rotation angle difference within one period that is demarcated by the predetermined period. In Embodiment 1, an average value of relative angle difference is calculated from a value obtained by dividing the areas SS by the period, and the assist power $\tau_{ma}$, $\tau_{mb}$ is calculated from Equations (1) and (2) above by using the average value. FIG. 5 demonstrates that if the relative angle difference does not decrease, the assist power τ calculated based thereon is also continuously generated. By calculating the assist power in the above-described manner, it is possible to calculate smooth assist power based on the man power. Therefore, in the power assisted carriage 1, assist power with a lower load on the user can be realized.

In this case, the assist power calculation units 20a, 20b change the period in which the relative angle difference is cleared in response to travel conditions. More specifically, in a case where the power assisted carriage 1 is to be moved from a stationary state, the assist power calculation units 20a, 20b increase the period in which the relative angle difference is cleared. The period can be increased, for example, by multiplying a standard period stored in a memory by a predetermined coefficient. As a result, the area SS calculated for the period increases and the value of assist power calculated from the average value can be increased. Therefore, the assist power with a lower load on the user can be realized. Such a control can be considered, for example, for the case in which the movement speed of the power assisted carriage 1 is positive and the movement acceleration is also positive, or for the case in which the movement speed is negative and the movement acceleration is also negative. Further, when the power assisted carriage 1 is to be decelerated and stopped, the assist power calculation units 20a, 20b shorten the period in which the relative angle difference is to be cleared. As a result, the area SS calculated for the period decreases and the assist power calculated from the average value can be decreased. As a result, an assisted movement that is safer for the user can be realized. Such a control can be considered, for example, for the case in which the movement speed of the power assisted carriage 1 is positive and the movement acceleration is negative or for the case in which the movement speed is negative and the movement acceleration is positive.

The period in which the relative angle difference is cleared may be changed in response to the article weight measured by the weight measurement unit 10a or the inclination angle detected by the inclination angle detection unit 10b. More specifically, when the article weight measured by the weight measurement unit 10a is large, the assist power calculation units 20a, 20b increase the period in which the relative angle difference is cleared. As a result, the calculated assist power can be increased even if the relative angle difference is the same. Therefore, the assist power with a lower load on the user can be realized. Conversely, when the article weight measured by the weight measurement unit 10a is small, the assist power calculation units 20a, 20b shortens the period in which the relative angle difference is cleared. As a result, the area SS calculated for the period decreases and the assist power calculated from the average value of the area can be decreased. Therefore, the assisted movement that is safer for the user can be realized.

Likewise, when the inclination angle detected by the inclination angle detection unit 10b is large, as on the rising slope, the assist power calculation units 20a, 20b also may increase the period in which the relative angle difference is cleared. As a result, the area SS calculated for the period increases and the assist power calculated from the average value of the area can be increased. Therefore, the assist power with a lower load on the user can be realized. Conversely, when the inclination angle detected by the inclination angle detection unit 10b is small, or when the carriage is on the descending slope, the assist power calculation units 20a, 20b may shorten the period in which the relative angle difference is cleared. As a result, the area SS calculated for the period decreases and the assist power calculated from the average value of the area can be decreased. Therefore, an assisted movement that is safer for the user can be realized.

When the power assisted carriage 1 has a plurality of operation modes (positioning mode, long distance movement mode, etc.), the period in which the relative angle difference is cleared (cleared to zero) may be changed according to the operation mode. In this case, the user can select the assist movement suitable for operation conditions by selecting the operation mode with a mode switch 29. The positioning mode is a mode selected when the carriage 1 is to be positioned in a target position. In this operation mode, the assist power is reduced by making the period shorter than the standard period. As a result, the power assisted carriage 1 can be moved strictly according to the user's operation and therefore can be easily positioned in the target position. The long distance movement mode is a mode selected when the power assisted carriage 1 is to be moved with the same speed. In this operation mode, the assist power is increased by making the period longer than the standard period. As a result, a load placed on the user when the power assisted carriage 1 is moved can be reduced.

Figure 4:
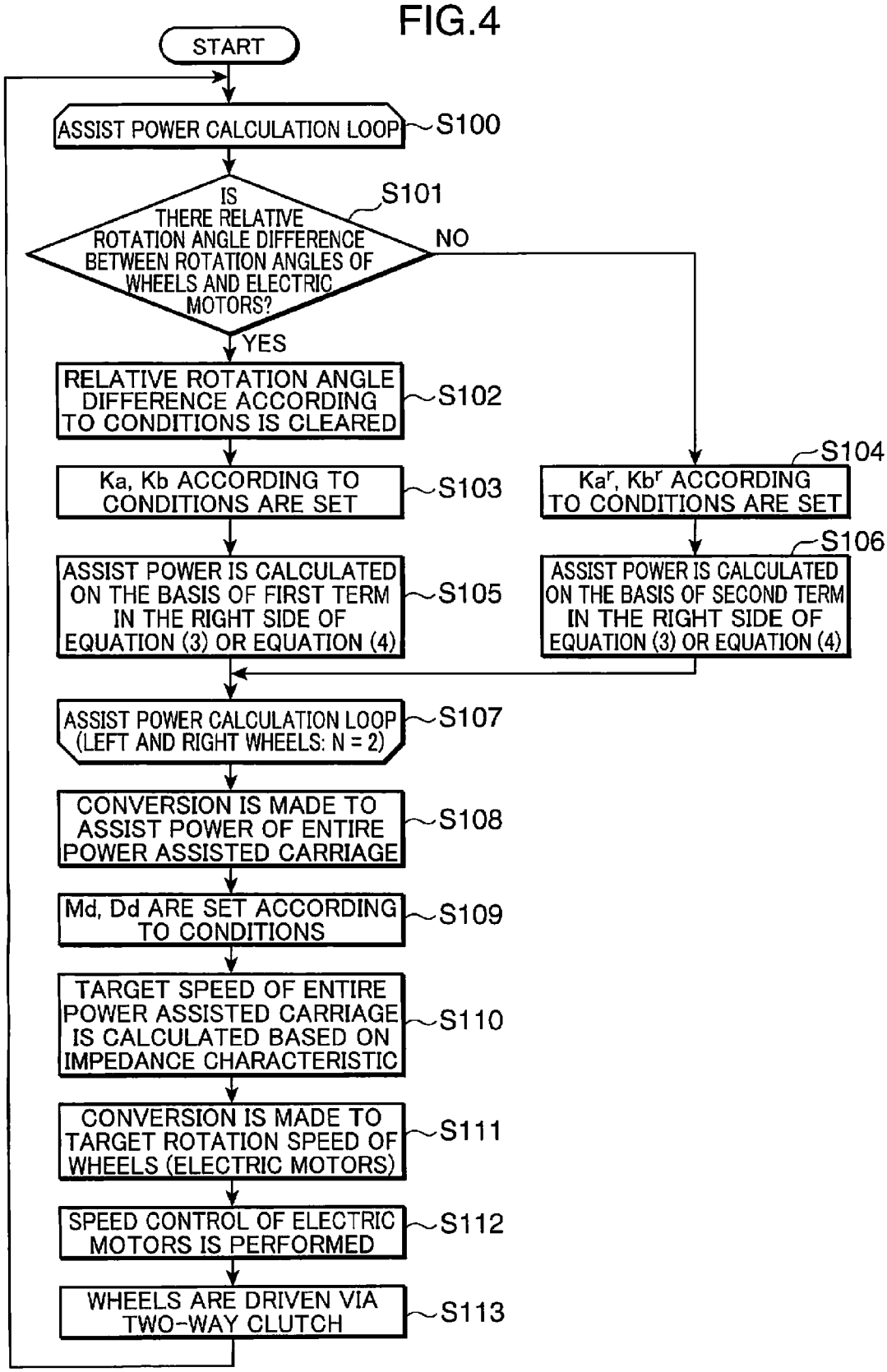
FIG. 4 is a flowchart of operation control of the power assisted carriage according to Embodiment 1 of the present invention.

A step of changing the period in which the relative angle difference is cleared is a step S103 in FIG. 4.

In this case, a case will be considered in which man power is applied to the carriage 1 such that the wheels 13a, 13b rotate in the direction opposite to the direction in which the electric motors 15a, 15b rotate. Because the input shafts of the clutches 18a, 18b rotate at this time, the output shafts of the clutches 18a, 18b cannot rotate freely in the direction opposite to the rotation direction of the input shafts according to the two-way clutch characteristic (the characteristic according to which when the input shaft rotates, the output shaft also rotates). Therefore, a relative angle difference cannot be generated between the rotation angles $\theta_{wa}$, $\theta_{wb}$ of the wheels 13a, 13b and the rotation angles $\theta_{ma}$, $\theta_{mb}$ of the electric motors 15a, 15b, and according to Equations (1) and (2) above, the assist power corresponding to the man power cannot be calculated. Accordingly, in Embodiment 1, Equations (1) and (2) are changed into Equations (3) and (4) below so that the assist power adapted for the man power could be calculated even when the man power has been applied such that the wheels 13a, 13b rotate in the direction opposite to the rotation direction of the electric motors 15a, 15b, $$\tau_{ma} = K_a(\theta_{wa} - \theta_{ma}) - K_a^r(\theta_{ma}^d - \theta_{ma}) \quad \text{(E3)}$$

$$\tau_{mb} = K_b(\theta_{wb} - \theta_{mb}) - K_b^r(\theta_{mb}^d - \theta_{mb}) \quad \text{(E4)}$$

where $K_a^r, K_b^r \in R$, $\theta_{ma}^d, \theta_{mb}^d \in R$

Here, $K_a^r$, $K_b^r$ defined by Equations (3) and (4) above are reverse gain constants. Further, $\theta_{ma}^d$, $\theta_{mb}^d$ are target rotation angles of the electric motors 15a, 15b. As follows from Equations (3) and (4), the assist power calculation units 20a, 20b calculate the assist power on the basis of a deviation between the relative rotation angle difference of the output shafts of the clutches 18a, 18b with respect to the input shafts of the clutches 18a, 18b and the actually measured values of rotation angles of the motors 15a, 15b with respect to the target rotation angles of the electric motors 15a, 15b.

$K_a, K_b, K_a^r, K_b^r$ are coefficients that can change their value according to travel conditions of the power assisted carriage 1 or the like, and the calculated assist power can be adjusted by changing these values. More specifically, the grip determination unit 12a determines whether the user has gripped the handle 12 of the power assisted carriage 1, and when the handle 12 has not been gripped, the assist power calculation units 20a, 20b set $K_a, K_b, K_a^r, K_b^r$ to zero. As a result, when the user has not gripped the handle 12, the assist power is calculated as zero at all times. Therefore, the erroneous assisted movement can be prevented. Where the user has gripped the handle 12, the assist power calculation units 20a, 20b determine $K_a, K_b, K_a^r, K_b^r$ as shown below. For example, when the weight of the article on the carriage unit 2 measured by the weight measurement unit 10a is large, the assist power calculation units 20a, 20b set $K_a, K_b, K_a^r, K_b^r$ comparatively large. As a result, comparatively large assist power can be calculated even when the relative angle difference of the wheels 13a, 13b and the electric motors 15a, 15b generated in response to the man power or the difference between the actually measured rotation angle and the target rotation angle of the input shafts of the clutches 18a, 18b is small. Therefore, the user can comfortably push the power assisted carriage. Conversely, when the weight of the article measured on the carriage unit 2 by the weight measurement unit 10a is small, the assist power calculation units 20a, 20b set $K_a, K_b, K_a^r, K_b^r$ comparatively small. As a result, comparatively small assist power can be calculated even when the relative angle difference of the wheels 13a, 13b and the electric motors 15a, 15b generated in response to the man power or the difference between the actually measured rotation angle and the target rotation angle of the input shafts of the clutches 18a, 18b is large. Therefore, the generation of excessively large assist power can be prevented and a safe assisted movement can be realized. In order to change the values of coefficients in the above-described manner, for example, $K_a, K_b, K_a^r, K_b^r$ may be set to values corresponding to the weight measured by the weight measurement unit 10a.

Likewise, on the rising slope, when the inclination angle detected by the inclination angle detection unit 10b is large, the assist power calculation units 20a, 20b set $K_a, K_b, K_a^r, K_b^r$ comparatively large. As a result, comparatively large assist power can be calculated even when the relative rotation angle difference of the wheels 13a, 13b and the electric motors 15a, 15b generated in response to the man power is small. Therefore, the user can comfortably push the power assisted carriage. Conversely, when the inclination angle detected by the inclination angle detection unit 10b is small or when on the descending slope, the assist power calculation units 20a, 20b set $K_a, K_b, K_a^r, K_b^r$ comparatively small. As a result, comparatively small assist power can be calculated even when the relative rotation angle difference of the wheels 13a, 13b and the electric motors 15a, 15b generated in response to the man power is large. Therefore, the generation of excessively large assist power can be prevented and a safe assisted movement can be realized (steps S103, S104). In order to change the values of coefficients in the above-described manner, for example, $K_a$, $K_b$, $K_a{}^r$, $K_b{}^r$ may be set to values corresponding to the inclination angle detected by the inclination angle detection unit 10b.

The second term in the right side of Equations (3) and (4) serves to calculate the assist power corresponding to the man power applied in the direction opposite to the assist direction of the electric motors 15a, 15b from a relative rotation angle difference between the target rotation angle $\theta_{ma}{}^d$, $\theta_{mb}{}^d$ and the actual rotation angles $\theta_{ma}$, $\theta_{mb}$ of the electric motors 15a, 15b. When the man power is applied so that the wheel 13a rotates in the same direction as the electric motor 15a, the two-way clutch 18a assumes a disengaged state and therefore no load is applied to the electric motor 15a. As a result, there is no angle difference between the target rotation angle $\theta_{ma}{}^d$ and the actual rotation angle $\theta_{ma}$ of the electric motor 15a and the second term in the right side of Equation (3) becomes zero. Therefore, the assist power is calculated by the first term in the right side of Equation (3). When the man power is applied so that the wheel 13a rotates in the direction opposite to the rotation direction of the electric motor 15a, the two-way clutch 18a assumes an engaged state and therefore there is no angle difference between the rotation angle $\theta_{wa}$ of the wheel 13a and the rotation angle $\theta_{ma}$ of the electric motor 15a and the first term in the right side of Equation (3) becomes zero. Therefore, the assist power is calculated by the second term in the right side of Equation (3). Likewise, when the man power is applied so that the wheel 13b rotates in the same direction as the electric motor 15b, the assist power is calculated by the first term in the right side of Equation (4), and when the man power is applied so that the wheel 13b rotates in the direction opposite to the rotation direction of the electric motor 15b, the assist power is calculated by the second term in the right side of Equation (4). When the first and second terms in Equations (3) and (4) are zero, the assist torque is calculated as zero (steps S105, S106).

In the assist power conversion unit 21, the assist power $F_m$, of the entire power assisted carriage 1 defined by Equation (8) below is calculated from the assist power $\tau_{ma}$, $\tau_{mb}$ calculated from Equations (3) and (4). In this case, a speed V of the power assisted carriage 1 and a rotation speed $d\theta/dt$ of the wheels 13a, 13b are defined as described below by the speed v in the X axis direction of the carriage coordinate system $\Sigma r$ and rotation speed $\omega$ about the Z axis of the carriage coordinate system $\Sigma r$ (in the formula, T is a symbol denoting a transposed matrix).

$$V = [\,v\ \ \omega\,]^T \in R^2$$

$$\frac{d\theta}{dt} = [\,\dot\theta_{wa}\ \ \dot\theta_{wb}\,]^T \in R^2$$

where $\omega \in R$, $v \in R$

It follows from above that the relationship represented by Equation (5) below is valid. In Equation (5) below, J is called a Jacobian matrix (Jacobian). $L_w$ stands for a radius of the wheels 13a, 13b, and $L_t$ stands for a spacing (tread) of the wheels 13a, 13b.

$$\begin{bmatrix} v \\ \omega \end{bmatrix} = J \begin{bmatrix} \dot\theta_{ma} \\ \dot\theta_{mb} \end{bmatrix} \Leftrightarrow \begin{bmatrix} \dot\theta_{ma} \\ \dot\theta_{mb} \end{bmatrix} = J^{-1} \begin{bmatrix} v \\ \omega \end{bmatrix} \quad \text{(E5)}$$

$$J = \begin{bmatrix} \dfrac{L_w}{2} & \dfrac{L_w}{2} \\ \dfrac{L_w}{L_t} & -\dfrac{L_w}{L_t} \end{bmatrix} \in R^{2\times 2}$$

where $L_w \in R$, $L_t \in R$

A force F applied to the power assisted carriage 1 can be defined as described below by using a force f acting in the X axis direction of the carriage coordinate system $\Sigma r$ and a momentum n about the Z axis of the carriage coordinate system $\Sigma r$.

$$F = [f\ n]^T \in R^2$$

where $f \in R$, $n \in R$

Further, where a torque generated in the wheel 13a is denoted by $\tau_a$, a torque generated in the wheel 13b is denoted by $\tau_b$, and a torque generated in the wheels 13a, 13b following the force F applied to the power assisted carriage 1 is denoted by $\tau$, the $\tau$ can be represented in the following manner.

$$\tau = [\tau_a\ \tau_b]^T \in R^2$$

where $\tau_a$, $\tau_b \in R$

The relationship such as represented by Equation (6) is valid between the torque and the force.

$$\tau = J^T F \quad (6)$$

Therefore, the assist power conversion unit 21 can calculate the assist power $F_m$ of the entire power assisted carriage 1 from the assist powers $\tau_{ma}$, $\tau_{mb}$ by using Equation (7) below that is obtained by transforming Equation (6) above (step S108).

$$\begin{bmatrix} f_m \\ n_m \end{bmatrix} = J^{-T} \begin{bmatrix} \tau_{ma} \\ \tau_{mb} \end{bmatrix} \quad \text{(E7)}$$

$$F_m = [\,f_m\ \ n_m\,]^T \in R^2 \quad \text{(E8)}$$

The impedance control unit 22 then conducts impedance control on the basis of the calculated assist power $F_m$ of the entire carriage. Where a target speed of the power assisted carriage 1 generated based on the impedance control is denoted by $dxd/dt$ and a target acceleration is denoted by $d^2xd/dt^2$, these $dxd/dt$ and $d^2xd/dt^2$ can be defined as shown below. Here, $V_d$ stands for a target speed in the X axis direction in the carriage coordinate system $\Sigma r$, and $\omega_d$ stands for a target rotation speed about the Z axis of the carriage coordinate system $\Sigma r$.

$$\frac{dxd}{dt} = [V_d, \omega_d] \in R^2$$

$$\frac{d^2 xd}{dt^2} = [\dot V_d, \dot\omega_d] \in R^2$$

where $V_d \in R$, $\omega_d \in R$

The impedance control unit 22 has an impedance characteristic constituted, as shown by Equation (11) below, by an apparent mass characteristic $M_d$ of the power assisted carriage 1, such as shown in Equation (9) below, and an apparent viscosity characteristic $D_d$ of the power assisted carriage 1, such as shown in Equation (10) below. In other words, the impedance control unit 22 stores the relationship shown in Equation (11) that regulates the impedance characteristic.

$$M_d = \begin{bmatrix} M_d^x & 0 \\ 0 & M_d^\theta \end{bmatrix} \in R^{2\times 2} \tag{E9}$$

$$D_d = \begin{bmatrix} D_d^x & 0 \\ 0 & D_d^\theta \end{bmatrix} \in R^{2\times 2} \tag{E10}$$

$$\begin{bmatrix} f_m \\ n_m \end{bmatrix} = \begin{bmatrix} M_d^x & 0 \\ 0 & M_d^\theta \end{bmatrix} \begin{bmatrix} \dot{v}_d \\ \dot{\omega}_d \end{bmatrix} + \begin{bmatrix} D_d^x & 0 \\ 0 & D_d^\theta \end{bmatrix} \begin{bmatrix} v_d \\ \omega_d \end{bmatrix} \tag{E11}$$

Equation (11) above can be transformed into Equation (12) below in the following manner.

$$\begin{bmatrix} v_d \\ \omega_d \end{bmatrix} = \begin{bmatrix} \frac{1}{M_d^x s + D_d^x} & 0 \\ 0 & \frac{1}{M_d^\theta s + D_d^\theta} \end{bmatrix} \begin{bmatrix} f_m \\ n_m \end{bmatrix} \tag{E12}$$

The impedance control unit 22 can change the values of the apparent mass characteristic $M_d$ and the apparent viscosity characteristic $D_d$ in response to travel conditions of the power assisted carriage 1. As a result, the assisted movement characteristic of the power assisted carriage 1 can be randomly changed. In other words, by changing the impedance characteristic, it is possible to adjust the assist power calculated by the assist power calculation units 20a, 20b and thus change the drive force generated by the power assisted carriage 1 (wheels 13a, 13b). More specifically, the grip determination unit 12a determines whether the user has gripped the handle 12 of the power assisted carriage 1, and when it is determined that the handle has not been gripped, the impedance control unit 22 sets infinitely large values for $M_d$, $D_d$. As a result, when the user has not gripped the handle 12, the target speed based on the assist power is hardly generated even when a disturbance such as noise is generated and therefore safety can be increased. Where the handle 12 has been gripped, the impedance control unit 22 determines $M_d$, $D_d$ as described below. When the power assisted carriage 1 starts moving from a stationary state, the impedance control unit 22 sets $M_d$, $D_d$ comparatively small. As a result, comparatively large assisted movement can be obtained even with a small man power action (generation of power assist). A case in which the movement speed of the power assisted carriage 1 is positive and the movement acceleration is also positive and a case in which the movement speed is negative and the movement acceleration is also negative can be assumed as the cases corresponding to such a scenario. When the power assisted carriage 1 decelerates and stops, the impedance control unit 22 sets $M_d$, $D_d$ comparatively large. As a result, a gradually decelerating assisted movement can be obtained. A case in which the movement speed of the power assisted carriage 1 is positive and the movement acceleration is negative and a case in which the movement speed is negative and the movement acceleration is positive can be assumed as the cases corresponding to such a scenario. When the moving power assisted carriage 1 is to be rapidly stopped, the impedance control unit 22 decreases $M_d$ and increases $D_d$. As a result, rapidly decelerating assisted movement can be obtained. A case in which the user releases the handle 12 can be assumed as the case corresponding to such a scenario. Further, since the power assisted carriage 1 has a plurality of operation modes (positioning mode, long distance movement mode, etc.), the values of $M_d$, $D_d$ may be changed according to the operation mode. In this case, the user can select the assist movement suitable for such a state by selecting the operation mode (step S109). In other words, the impedance control unit 22 adjusts the impedance characteristic in response to the selected operation mode.

In this case, where the assist power $F_m$ of the entire carriage that has been calculated by Equation (7) above is substituted to Equation (12) above, a target speed dxd/dt satisfying the impedance characteristic shown by Equation (11) can be obtained (step S110).

In the wheel control unit 23, the obtained target speed dxd/dt of the entire power assisted carriage 1 is converted into the target revolution speeds $\theta_{wa}^d$, $\theta_{wb}^d$ of the wheels 13a, 13b, which are defined below, by using Equation (7) above, and a command is issued to the servo drivers 16a, 16b of the wheel drive unit 4 (step S111).

$$\theta_{wa}^d, \theta_{wb}^d \in R$$

The wheel drive unit 4 conducts speed control of the electric motors 15a, 15b such that the wheels 13a, 13b assume the target rotation speeds $\theta_{wa}^d$, $\theta_{wb}^d$ (step S112). As a result, the power of the electric motors 15a, 15b is transmitted to the wheels 13a, 13b via the clutches 18a, 18b, and the wheels 13a, 13b rotate at the target rotation speeds $\theta_{wa}^d$, $\theta_{wb}^d$ (step S113). Thus, impedance control corresponding to the entire assist power $F_m$ obtained from Equation (7) above can be realized. With the above-described configuration, control of assisted movement corresponding to the applied man power can be realized.

In Embodiment 1, the servo drivers 16a, 16b are assumed to be speed controlled, but instead the position of servo drivers 16a, 16b may be controlled. In this case, the wheel control unit 23 may calculate the target speed of the wheels 13a, 13b by taking the target speed of the entire power assisted carriage 1 as input information, the target angle of the wheels 13a, 13b may be calculated by further integrating the target speed, and a signal corresponding to the target angle may be inputted to the servo driver 16a, 16b.

Further, in Embodiment 1, the assist power calculated by the assist power calculation units 20a, 20b is inputted via the assist power conversion unit 21, impedance control unit 22, and wheel control unit 23 to the servo drivers 16a, 16b that are position controlled or speed controlled, but instead the assist power may be directly inputted to the servo drivers 16a, 16b that is torque controlled (current controlled). In this case, the assist power is calculated by using Equations (13), (14) below rather than Equations (3), (4) above.

$$\tau_{ma} = K_a(\theta_{wa} - \theta_{ma}) - K_a^r(\tau_{ma}^d - \tau_{ma}) \tag{E13}$$

$$\tau_{mb} = K_b(\theta_{wb} - \theta_{mb}) - K_b^r(\tau_{mb}^d - \tau_{mb}) \tag{E14}$$

where $\tau_{ma}^d, \tau_{mb}^d \in R$

In these equations, $\tau_{ma}^d$, $\tau_{mb}^d$ are assist power which a command has been issued one period before for the servo drivers 16a, 16b. Further, $\tau_{ma}^d$, $\tau_{mb}^d$ are torques (power) actually outputted by the electric motors 15a, 15b. In this case, the power assisted carriage 1 may be provided with input torque detection units 19a, 19b (see FIG. 2) for detecting the torque that is actually outputted by the electric motor or servo motor. Thus, when man power is applied to the carriage 1 such that the wheels 13a, 13b rotate in the direction opposite to the rotation direction of the rotary shafts (input shafts of the clutch) of the electric motors 15a, 15b, the assist power is calculated on the basis of a difference between the target torque applied to the input shafts of the clutches 18a, 18b and the torque that is actually generated at the input shafts of the clutches 18a, 18b.

Figure 6:
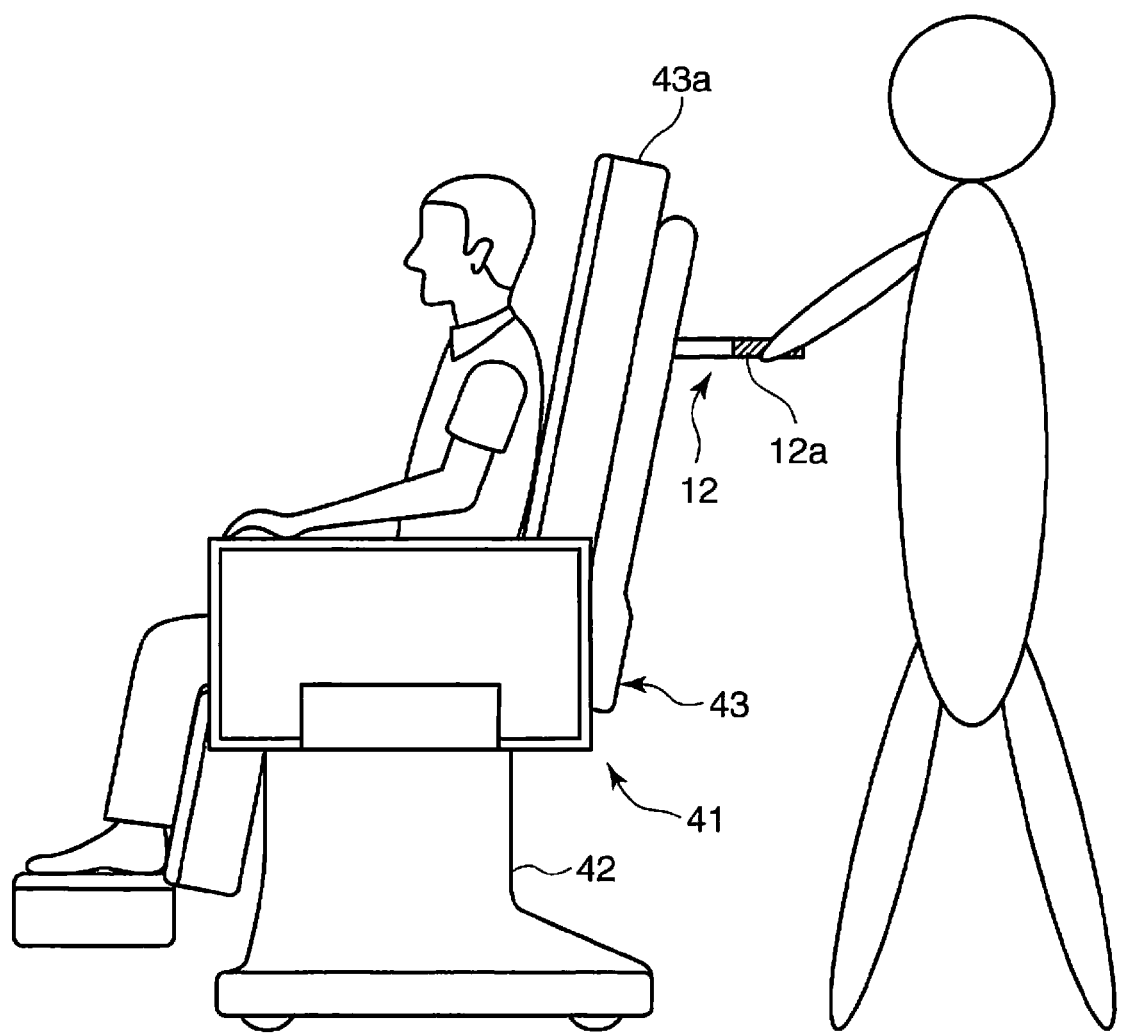
FIG. 6 is a side view of an assisted electric wheelchair according to another embodiment of the present invention.
Figure 7:
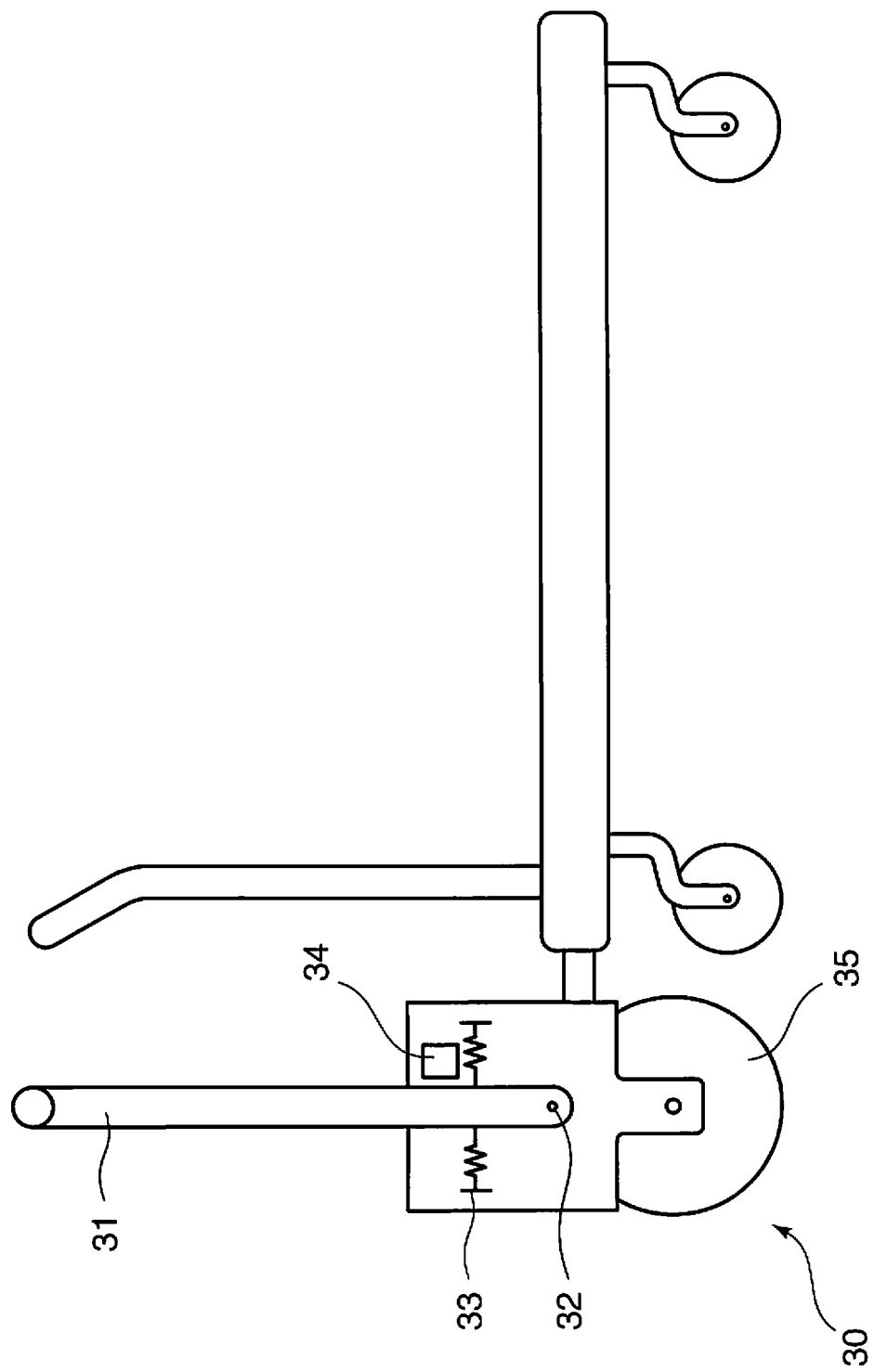
FIG. 7 is a side view of the conventional power assisted carriage.

Further, when embodiment 1 is applied to an actual power assisted carriage or assisted electric wheelchair, it can be appropriately used together with a force sensor system that has been conventionally used. For example, power assist according to Embodiment 1 may be performed on a flat ground, whereas power assist based on man power detected by a force sensor may be performed on a slope. Further, in the case of a configuration in which a patient (occupant) operates a wheel chair by himself, the wheelchair being the assisted electric wheelchair according to an embodiment of the present invention, man power may be detected by a force sensor carried on a hand rim (drive wheel grasping portion of the wheelchair) and power assist may be performed on the basis of the detected man power. By contrast, in the case of a configuration in which the electric wheelchair 41 is pushed from behind by a nurse (an assistant), as shown in FIG. 6, the gripping determination unit 12a may be provided at the handle 12 provided behind the seat back 43a. In such an electric wheelchair 41, an accommodation section 42 where the wheel drive unit 4 and other components are disposed is provided below the seat 43.

Summary of Embodiments

The above-described embodiment is summarized below.

(1) A power assisted vehicle according to the embodiments including: a wheel drive unit that transmits assist power from a power source to wheels via a clutch capable of connecting and disconnecting power transmission; an input rotation angle detection unit that detects a rotation angle of an input shaft of the clutch; an output rotation angle detection unit that detects a rotation angle of an output shaft of the clutch; and an assist power calculation unit that calculates a relative angle difference between the rotation angle of the input shaft of the clutch detected by the input rotation angle detection unit and the rotation angle of the output shaft of the clutch detected by the output rotation angle detection unit, clears to zero the relative angle difference in a predetermined period, and calculates the assist power on the basis of the relative angle difference in each period.

Therefore, the assist power can be prevented from being too high even when the user applies a large operation force, and smooth assist power adapted for the man power applied to the vehicle can be obtained.

(2) The above-described power assisted vehicle, wherein the assist power calculation unit may calculate the assist power on the basis of an area in each period bounded by a transition curve indicating transition in the relative angle difference with time and a transition line at which the relative angle difference is zero.

In such an embodiment, the area in each period corresponds to an integral value of the relative angle difference for one period. Therefore, the assist power corresponding to the relative angle difference in each period can be obtained by calculating the assist power on the basis of the area.

(3) When the above-described power assisted vehicle is further provided with a movement speed and acceleration calculation unit that calculates a movement speed and a movement acceleration of the power assisted vehicle, the assist power calculation unit may change the period in which the relative angle difference is cleared, according to at least one of the movement acceleration and movement speed of the assist power vehicle calculated by the movement speed and acceleration calculation unit.

In such an embodiment, the assist power is adjusted to a value corresponding to at least one of the movement speed and movement acceleration of the power assisted vehicle. Therefore, an assisted movement that is safer for the user can be realized.

(4) When the above-described power assisted vehicle is further provided with a weight measurement unit that measures a weight of an object placed on the assist power vehicle, the assist power calculation unit may change the period in which the relative angle difference is cleared, according to the weight detected by the weight measurement unit.

In such an embodiment, the assist power is adjusted to a value corresponding to the weight loaded on the power assisted vehicle. Therefore, an assisted movement that is safer for the user can be realized.

(5) When the above-described power assisted vehicle is further provided with an inclination angle detection unit that detects an inclination angle of a movement surface, the assist power calculation unit may change the period in which the relative angle difference is cleared, according to the inclination angle of the movement surface detected by the inclination angle detection unit.

In such an embodiment, the assist power is adjusted to a value corresponding to the inclination angle of the movement surface. Therefore, a safer assisted movement corresponding to the usage conditions can be realized.

(6) When the above-described power assisted vehicle has a plurality of operation modes, the assist power calculation unit may change the period in which the relative angle difference is cleared, according to the selected operation mode.

In such an embodiment, the assist power according to the selected operation mode is obtained. Therefore, an assisted movement corresponding to the usage target can be realized.

(7) In the power assisted vehicle, the clutch may be a two-way clutch capable of performing power transmission during rotation in forward and reverse directions and disconnection of power transmission.

In such an embodiment, safe assisted movement can be obtained in the same manner in the forward movement and in the reverse movement of the power assist vehicle. Further, safe assisted movement can be obtained when man power is applied that causes the vehicle to move in reverse as it moves forward and also when man power is applied that causes the vehicle to move forward as it moves in reverse.

(8) In the power assisted vehicle provided with the two-way clutch, the assist power calculation unit may calculate the assist power on the basis of the relative angle difference and a deviation of an actually measured value from a target value used for instruction to the power source.

In this embodiment, the assist power corresponding to a deviation of an actually measured value from a target value used for instruction to the power source can be derived even when man power is applied to the power assisted vehicle such that the wheels are rotated in the direction opposite to the drive direction of the drive source and an adequate value cannot be obtained with the assist power corresponding only to the relative angle difference. Therefore, safe assisted movement can be obtained even in the case in which man power is applied to the power assisted vehicle such that the wheels are rotated in the direction opposite to the drive direction of the drive source.

(9) In the power assisted vehicle provided with the two-way clutch, when the relative angle difference is zero, the assist power calculation unit may calculate the assist power on the basis of a deviation of an actually measured value from a target value used for instruction to the power source.

In this embodiment, safe assisted movement can be obtained even when the relative angle difference between the input shaft and output shaft of the two-way clutch is zero.

(10) Where the wheel drive unit includes an input torque detection unit that detects a torque of the input shaft of the clutch in the above-described power assisted vehicle, when the relative angle difference is zero, the assist power calculation unit may calculate the assist power on the basis of a difference between a target torque provided to the input shaft of the clutch and the torque of the input shaft of the clutch detected by the input torque detection unit.

In this embodiment, safe assisted movement can be obtained even when the relative angle difference between the input shaft and output shaft of the two-way clutch is zero.

(11) In the power assisted vehicle, the wheel drive unit may have an impedance characteristic constituted by an apparent mass characteristic and an apparent viscosity characteristic of the power assisted vehicle, and drives the power source by adjusting the assist power according to the impedance characteristic.

In this embodiment, the assisted movement characteristic of the power assisted vehicle can be changed.

(12) When the power assisted vehicle includes a movement speed and acceleration calculation unit that calculates a movement speed and a movement acceleration of the power assisted vehicle, the wheel drive unit may change a value of at least one of the apparent mass characteristic and the apparent viscosity characteristic of the impedance characteristic according to at least one of the movement acceleration and movement speed of the assist power vehicle calculated by the movement speed and acceleration calculation unit.

In this embodiment, the impedance characteristic can be changed according to the value of movement speed or value of movement acceleration of the power assisted vehicle. Therefore, an assisted movement characteristic corresponding to the movement of the vehicle can be obtained.

(13) When the power assisted vehicle has a plurality of operation modes, the assist power calculation unit may change at least one of the apparent mass characteristic and the apparent viscosity characteristic of the impedance characteristic according to the selected operation mode.

In this embodiment, an assist power characteristic corresponding to the usage target can be obtained.

As described hereinabove, according to the present embodiment, it is possible to provide a power assisted vehicle that can be safely operated without generating an excessively high power, even when the operator applies a large operation force, and also to provide a control method for the power assisted vehicle.

INDUSTRIAL APPLICABILITY

As mentioned hereinabove, in accordance with the present invention, even when a power assisted vehicle cannot move because of a step or an obstacle, although an operation force is applied thereto, the vehicle can be safely moved without generating excessively large assist power. Therefore, the present invention is useful for power assisted vehicles such as power assisted carriages and assisted electric wheelchairs.

The invention claimed is:

1. A power assisted vehicle, comprising:
   a wheel drive unit that transmits assist power from a power source to wheels via a clutch capable of connecting and disconnecting power transmission;
   an input rotation angle detection unit that detects a rotation angle of an input shaft of the clutch;
   an output rotation angle detection unit that detects a rotation angle of an output shaft of the clutch; and
   an assist power calculation unit that calculates a difference value indicative of a relative angle difference between the rotation angle of the input shaft of the clutch detected by the input rotation angle detection unit and the rotation angle of the output shaft of the clutch detected by the output rotation angle detection unit, resets the difference value to zero at a predetermined period, and calculates the assist power on the basis of the relative angle difference indicated by the difference value for each predetermined period.

2. The power assisted vehicle according to claim 1, wherein
   the assist power calculation unit calculates the assist power on the basis of an area in each period bounded by a transition curve indicating transition in the relative angle difference with time and a transition line at which the relative angle difference is zero.

3. The power assisted vehicle according to claim 1, further comprising:
   a movement speed and acceleration calculation unit that calculates a movement speed and a movement acceleration of the power assisted vehicle, wherein
   the assist power calculation unit changes the period in which the relative angle difference is cleared, according to at least one of the movement acceleration and movement speed of the assist power vehicle calculated by the movement speed and acceleration calculation unit.

4. The power assisted vehicle according to claim 1, further comprising:
   a weight measurement unit that measures a weight of an object placed on the assist power vehicle, wherein
   the assist power calculation unit changes the period in which the relative angle difference is cleared, according to the weight detected by the weight measurement unit.

5. The power assisted vehicle according to claim 1, further comprising:
   an inclination angle detection unit that detects an inclination angle of a movement surface, wherein
   the assist power calculation unit changes the period in which the relative angle difference is cleared, according to the inclination angle of the movement surface detected by the inclination angle detection unit.

6. The power assisted vehicle according to claim 1, wherein
   a plurality of operation modes are provided, and
   the assist power calculation unit changes the period in which the relative angle difference is cleared, according to the selected operation mode.

7. The power assisted vehicle according to claim 1, wherein
   the clutch is a two-way clutch capable of performing power transmission during rotation in forward and reverse directions and disconnection of power transmission.

8. The power assisted vehicle according to claim 7, wherein
   the assist power calculation unit calculates the assist power on the basis of the relative angle difference and a deviation of an actually measured value from a target value used for instruction to the power source.

9. The power assisted vehicle according to claim 8, wherein
   when the relative angle difference is zero, the assist power calculation unit calculates the assist power on the basis of a deviation of an actually measured value from a target value used for instruction to the power source.

10. The power assisted vehicle according to claim 8, wherein
   the wheel drive unit comprises an input torque detection unit that detects a torque of the input shaft of the clutch, and
   when the relative angle difference is zero, the assist power calculation unit calculates the assist power on the basis a difference between a target torque provided to the input shaft of the clutch and the torque of the input shaft of the clutch detected by the input torque detection unit.

11. The power assisted vehicle according to claim 1, wherein
   the wheel drive unit has an impedance constituted by an apparent mass characteristic and an apparent viscosity of the power assisted vehicle, and drives the power source by adjusting the assist power according to the impedance.

12. The power assisted vehicle according to claim 11, comprising:
   a movement speed and acceleration calculation unit that calculates a movement speed and a movement acceleration of the power assisted vehicle, wherein
   the wheel drive unit changes a value of at least one of the apparent mass characteristic and the apparent viscosity of the impedance according to at least one of the movement acceleration and movement speed of the assist power vehicle calculated by the movement speed and acceleration calculation unit.

13. The power assisted vehicle according to claim 11, wherein
   a plurality of operation modes are provided, and
   the assist power calculation unit changes at least one of the apparent mass characteristic and the apparent viscosity of the impedance according to the selected operation mode.

* * * * *